United States Patent
Previtali

(10) Patent No.: US 12,231,481 B2
(45) Date of Patent: Feb. 18, 2025

(54) METHOD FOR SENDING AN AUDIO STREAM FROM A TERMINAL PARTICIPATING IN A CONFERENCE SESSION INVOLVING A PLURALITY OF OTHER THIRD-PARTY TERMINALS

(71) Applicant: STREAMWIDE, Paris (FR)

(72) Inventor: Florent Previtali, Saint Maur des Fosses (FR)

(73) Assignee: STREAMWIDE, Paris (FR)

( * ) Notice: Subject to any disclaimer, the term of this patent is extended or adjusted under 35 U.S.C. 154(b) by 0 days.

(21) Appl. No.: 18/386,146

(22) Filed: Nov. 1, 2023

(65) Prior Publication Data

US 2024/0155016 A1 May 9, 2024

(30) Foreign Application Priority Data

Nov. 4, 2022 (FR) .................................. 2211518

(51) Int. Cl.
*H04L 65/70* (2022.01)
*G10L 25/51* (2013.01)

(52) U.S. Cl.
CPC .............. *H04L 65/70* (2022.05); *G10L 25/51* (2013.01)

(58) Field of Classification Search
CPC ................................. G10L 25/51; H04L 65/70
See application file for complete search history.

(56) References Cited

U.S. PATENT DOCUMENTS

| | | | | |
|---|---|---|---|---|
| 5,991,277 A | * | 11/1999 | Maeng .................. | H04M 3/569 370/263 |
| 7,415,122 B2 | * | 8/2008 | Soutar .................. | H04R 1/2807 381/189 |
| 8,005,023 B2 | * | 8/2011 | Li .......................... | H04L 12/16 370/260 |
| 9,160,551 B2 | * | 10/2015 | Murali ................ | H04L 12/1831 |
| 9,305,563 B2 | * | 4/2016 | Jeong ................... | G10L 19/002 |
| 9,554,091 B1 | * | 1/2017 | Malegaonkar ......... | H04N 7/152 |
| 2005/0062843 A1 | * | 3/2005 | Bowers ................. | H04N 7/147 348/E7.084 |
| 2006/0136200 A1 | * | 6/2006 | Rhemtulla ........... | H03K 19/177 704/214 |
| 2022/0360742 A1 | * | 11/2022 | Krol ....................... | G10L 25/51 |

FOREIGN PATENT DOCUMENTS

EP 1868363 A1 12/2007

* cited by examiner

*Primary Examiner* — George C Neurauter, Jr.
(74) *Attorney, Agent, or Firm* — von Briesen & Roper, s.c.

(57) ABSTRACT

Examples set forth a method, implemented by a terminal, for sending an audio stream from said terminal participating in a conference session in which a plurality of third-party terminals are further participating; wherein data packets of the audio streams transmitted by said terminal and said third-party terminals are encapsulated according to an internet protocol, and wherein an audio stream transmitted by each of said terminal and said third-party terminals is sent to a session server which distributes the audio stream to the other terminals participating in the conference, the method comprising: determining at least one audio parameter of the audio stream acquired by said terminal, sending or not sending the audio stream to the session server as a function of a value of the at least one audio parameter.

11 Claims, 3 Drawing Sheets

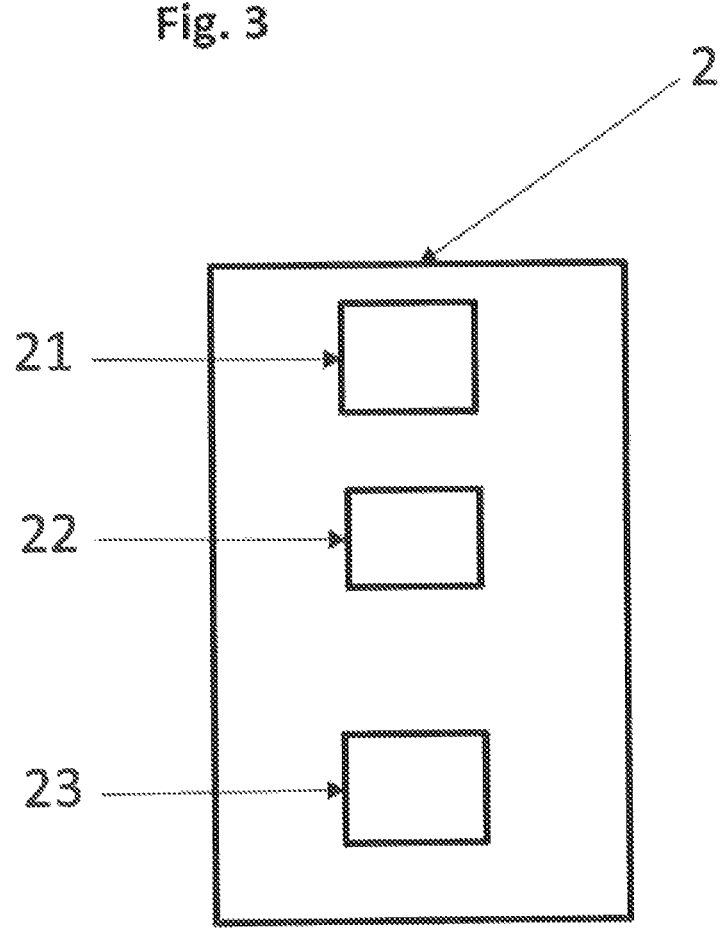

METHOD FOR SENDING AN AUDIO STREAM FROM A TERMINAL PARTICIPATING IN A CONFERENCE SESSION INVOLVING A PLURALITY OF OTHER THIRD-PARTY TERMINALS

CROSS-REFERENCE TO RELATED APPLICATION

This application claims priority under 35 USC § 119 and the Paris Convention to French Patent Application 2211518 filed on Nov. 4, 2022.

TECHNICAL FIELD OF THE DISCLOSURE

The present disclosure is concerned with the field of data exchange over networks using Internet protocols within the scope of audio and/or video type conferences.

BACKGROUND OF THE DISCLOSURE

Data exchanges via networks using Internet protocols are widely used within the scope of audio and/or video conferences between remote participants. In particular, there are a number of applications for holding conferences involving a large number of participants, who connect and take part in the conference via an adapted electronic device, or terminal.

An audio and/or video conference between several participants is generally managed, from the point of view of bandwidth and of the different audio/video data streams to be processed and transmitted to different participants, by a session server which centralizes all data stream processing and transmission.

Conference management and video and audio stream processing require important computational resources from the processor of the session server. The greater the number of participants, the greater the resources required.

The present disclosure improves this situation.

SUMMARY OF THE DISCLOSURE

In this respect, a method is provided, implemented by a terminal, for sending an audio stream from said terminal participating in a conference session in which a plurality of third-party terminals are further participating;
wherein data packets of the audio streams transmitted by said terminal and said third-party terminals are encapsulated according to an internet protocol, and wherein an audio stream transmitted by each of said terminal and said third-party terminals is sent to a session server which distributes the audio stream to the other terminals participating in the conference, the method comprising:
determining at least one audio parameter of the audio stream acquired by said terminal; and sending or not sending the audio stream to the session server according to a value of the at least one audio parameter.

Optionally, at least one of the at least one audio parameter corresponds to a sound volume of the audio stream acquired by the terminal, and wherein the audio stream is sent to the session server only when the sound volume of the audio stream acquired is greater than a determined sound volume threshold.

Optionally, the audio stream is sent to the session server and the method further comprises transmitting a value of the sound volume of the audio stream.

Optionally, the method further comprises receiving a value of the sound volume of the audio stream received from the session server, and the sound volume threshold is determined to be equal to the value of the sound volume received from the session server.

Optionally, at least one of the at least one audio parameter corresponds to a frequency of the audio stream acquired by said terminal, and the audio stream is sent to the session server only when the audio stream contains a frequency within a predetermined frequency range.

Optionally, the predetermined frequency range corresponds to a frequency range of human voice.

Optionally, the predetermined frequency range extends from 30 to 3000 Hz.

The method according to the present disclosure therefore makes it possible to save computational resources of the session server 3 responsible for distributing data streams of the conference session by cleverly using computational resources of the terminal to discriminate the audio streams upstream of the data exchanges between terminal and server. In this way, the session server doesn't have to decode, or even decrypt, all the audio streams acquired by the terminals in real time. Filtering, meaning selecting streams, is at least partly implemented at the transmitting terminals.

The application also relates to a terminal configured to implement any of the methods set forth by the present disclosure.

The application further relates to a computer program product including instructions for implementing any of the methods set forth by the present disclosure when this program is executed by a processor.

Finally, the application relates to a non-transitory computer-readable recording medium on which a program for implementing any of the methods set forth by the present disclosure is recorded when such program is executed by a processor.

BRIEF DESCRIPTION OF THE DRAWINGS

Further characteristics, details and advantages will become apparent upon reading the following detailed description, and analyzing the appended drawings, in which:

FIG. 3 represents an example of a terminal.

DETAILED DESCRIPTION OF THE DISCLOSURE

Figure 1:
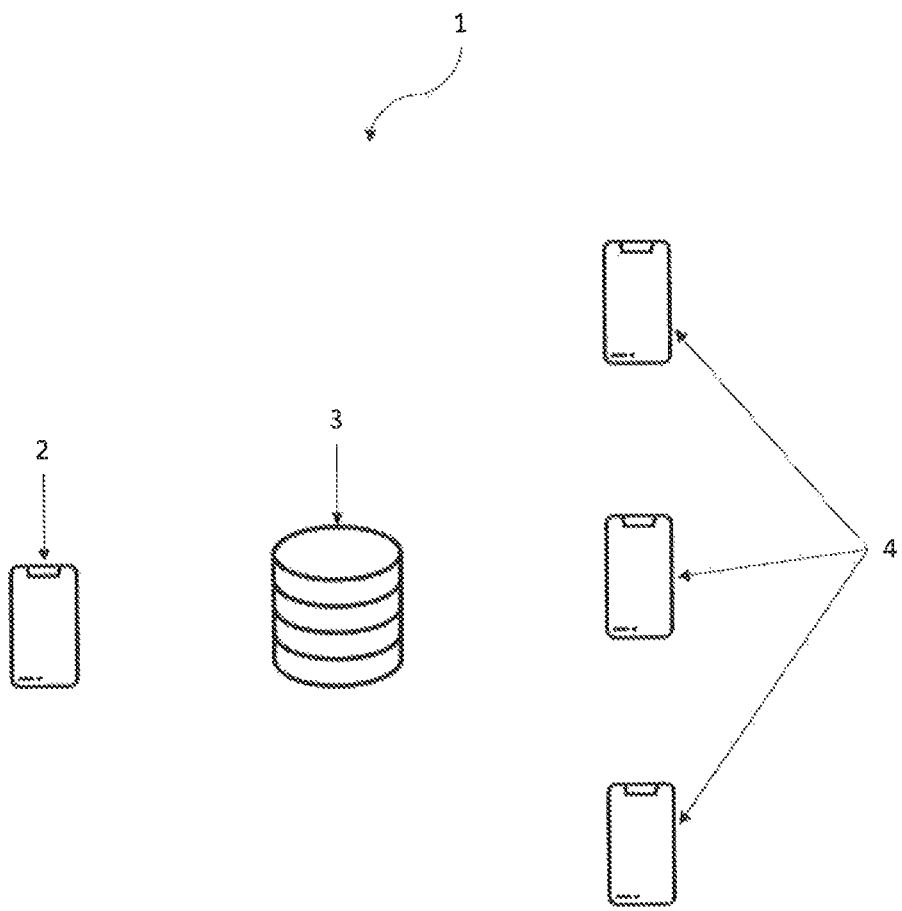
FIG. 1 schematically represents an example of a communication architecture in which a method for sending an audio data stream from a terminal participating in a conference session to a session server can be implemented.

With reference to FIG. 1, an example of a communication architecture 1 is now described, wherein a method for sending an audio data stream from a terminal participating in a conference session to a session server can be implemented.

A data stream, or stream, is defined in the present disclosure as corresponding to at least two successively acquired data packets. An audio data stream, or audio stream, is therefore defined as corresponding to at least two successively acquired audio data packets.

The communication architecture 1 comprises a terminal 2, a session server 3, and a plurality of third-party terminals 4. Herein, the terminal 2 and the third-party terminals 4 participate in a conference session at least partly managed by the session server 3. During this conference session, the terminal 2 and the plurality of third-party terminals 4 can exchange audio data streams in near-real time.

Thus, a data stream emitted by each of the terminal 2 and the third-party terminals 4 during the conference session is sent to the session server 3, which distributes the data stream in real time to the other terminals participating in the conference. Distribution of the data packets of the data streams between the session server and the terminals participating in the conference session can be direct or indirect. Distribution is said to be direct between the session server 3 and a terminal when the session server 3 sends the data packets of the data stream directly to this terminal. Distribution is said to be indirect between the session server 3 and a terminal when the session server 3 sends the data packets of the data stream to an intermediary device, for example another server, before the data packets of the data stream are sent to the terminal.

Figure 2:
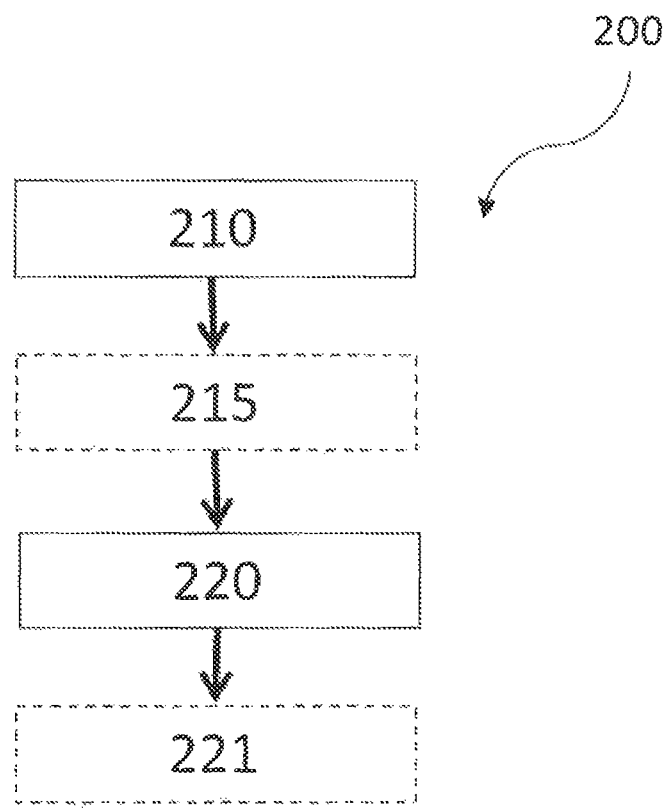
FIG. 2 represents an example of a method for sending an audio stream from a terminal participating in a conference session to a session server.

The terminal 2 is distinguished in the present disclosure from the third-party terminals 4 insofar as the method for sending an audio stream set forth with reference to FIG. 2 is implemented at terminal 2. However, the method set forth with reference to FIG. 2 and implemented by the terminal 2 can also be implemented by each of the third-party terminals 4 participating in the conference session.

The conference session can thus refer to an audio conference in which the terminal 2 and the third-party terminals 4 can exchange audio streams in real time via a session server 3.

In examples, the terminals in the conference session may exchange video data streams in real time, in addition to the audio data streams. In these examples, the conference session may therefore refer to a videoconference in which the terminal 2 and third-party terminals 4 may be caused to exchange, in real time, audio and video streams via a session server.

During the conference session, the data packets of the data streams transmitted by the terminal 2 and by the third-party terminals 4 are encapsulated according to an Internet protocol. This protocol is especially defined in the RFC 791 standard.

In the example described here, the data streams exchanged by terminal 2 and third-party terminals 4 during the conference session are encapsulated according to an RTP ("Real-time Transport Protocol") or SRTP ("Secure Real-time Transport Protocol") protocol.

A data stream encapsulated according to an RTP protocol is to be understood in the present application as a UDP ("User Datagram Protocol") data stream arranged to comply with an RTP protocol, that is according to a protocol especially defined by standard RFC 3550. In particular, when an RTP data stream is encrypted in such a way as to comply with an SRTP protocol, that is in accordance with the RFC 3711 standard, it is referred to as an SRTP data stream.

An audio stream transmitted by a terminal during the conference session is also encoded by a codec implemented by the terminal.

Thus, when a terminal 2 transmits an audio stream during a conference session, data packets of this audio stream are encapsulated according to an Internet protocol, are encoded by a codec, are optionally encrypted by an encryption key and then are sent to the session server 3, which distributes them to the third-party terminals 4 participating in the conference session.

A terminal may correspond to a fixed or mobile communication apparatus.

An example of a terminal 2 is especially represented in FIG. 3.

In examples, and as illustrated in FIG. 3, the terminal 2 may comprise a microphone 21 for acquiring an audio stream. Alternatively, it can be connected to a camera as a peripheral.

In examples and as illustrated in FIG. 3, the terminal 2 may comprise a camera 22 for acquiring a video stream. Alternatively, it can be connected to a microphone as a peripheral.

In examples, the terminal 2 may comprise a processor 23 configured to control execution of the methods set forth herein.

As previously explained, at least any one of the third-party terminals 4 participating in the conference session may correspond to the example terminal 2 described with reference to FIG. 3. For this purpose, at least any one of the third-party terminals 4 may comprise a microphone 21, a camera 22 and a processor 23.

A session server 3 may, for example, correspond to a media server.

An example of a method 200 for sending an audio stream from a terminal 2 participating in a conference session in which a plurality of third-party terminals 4 are further participating is now described with reference to FIG. 2. The audio stream from the terminal 2 is sent to the session server 3. The method for sending audio data stream from the terminal 2 to the session server 3 is implemented by the terminal 2. One of the objectives of the present disclosure is to reduce computational resources required by the session server 3 in managing the conference session in which the terminal 2 and third-party terminals 4 participate.

As illustrated by block 210, the method 200 comprises:
  determining at least one audio parameter of the audio stream acquired by said terminal.

In examples, at least one of the at least one audio parameter corresponds to the value of a sound volume of the audio stream acquired by the terminal.

In examples, at least one of the at least one audio parameter corresponds to a frequency of the audio stream acquired by said terminal.

As illustrated by block 220, the method 200 comprises:
  sending or not sending the audio stream to the session server depending on a value of the at least one audio parameter.

The method according to the present disclosure makes it possible to reduce number of audio streams received and therefore processed by the session server 3 during the conference session by not sending some of the audio streams acquired by the terminal 2. Indeed, within the scope of a real-time conference session involving a plurality of terminals, each of the terminals can transmit an audio stream within a same time interval. Consequently, transmitting each of the audio streams emitted by the terminals in the same time interval to participants could impair sound quality of the conference session. Under these conditions, the session server 3 can filter and select only some of the audio streams it receives in order to distribute them to conference session participants depending on audio parameters related to these audio streams, for example depending on a sound volume of the audio streams. Usually, to determine audio parameters of audio streams received, a session server has to decode each of the audio streams, and may have to decrypt these streams beforehand in the case of encrypted audio streams, in order to determine audio parameters that enable it to carry out processing depending on said parameters. Consequently, not sending an audio stream to the session server saves at least one decoding operation and one operation of determining the audio parameters, and possibly saves a decryption operation at the session server 3 when communications are encrypted. The method according to the present disclosure therefore makes it possible to save computational resources of the session server by cleverly using computational resources of the terminal 2 to discriminate the audio streams upstream, before they are transmitted to the session server.

In examples in which at least one of the at least one audio parameters corresponds to sound volume of the audio stream, the audio stream is sent to the session server only when the sound volume of the acquired audio stream is greater than a determined sound volume threshold. These examples prevent the session server 3 from receiving and processing audio streams for which the sound volume is lower than the determined sound volume threshold. A sound volume may, for example, correspond to an average sound volume of a predetermined number of audio packets belonging to the audio stream. As it is a real-time conference, it is appropriate to minimize latency between the acquisition of the audio stream by terminal 2 and its transmission to session server 3. A compromise is therefore made between precise determination of the audio stream volume and delay in transmitting this audio stream if necessary. The audio stream can therefore be temporarily stored at the terminal 2 to determine its sound volume before being sent to the session server if its sound volume was determined to be greater than the sound volume threshold.

In examples, and as illustrated by block 215, the method may also comprise:

receiving a value of the sound volume from the session server.

In such examples, the sound volume threshold below which the audio stream from terminal 2 is not sent to session server 3 is determined to be equal to the value of the sound volume received from session server 3.

In embodiments, the session server 3 can determine, in real time and depending on the audio streams distributed to the participants in the conference session, a sound volume below which new audio streams received will not be processed. For example, session server 3 can be configured to distribute a predetermined maximum number of simultaneous audio streams to conference session participants. In such a case, the selection of the streams to be transmitted can be made by favoring the audio streams with the highest volumes among those received. The session server 3 can send the terminal 2 a value of the sound volume corresponding to the sound volume of the lowest-volume audio stream among the audio streams distributed. In this way, only an audio stream with sufficient volume to be distributed will be sent by terminal 2 to the session server 3. Audio streams with a lower volume are filtered by the transmitting terminal itself rather than by the session server 3.

In examples in which the audio stream is sent by the terminal 2 to the session server 3, and as illustrated by block 221, the method 200 can also comprise:

transmitting a value of the sound volume of the audio stream sent to the session server 3.

These examples enable the session server 3 to access the sound volume of the audio stream sent by the terminal 2 without decoding the audio stream itself, and without possibly decrypting it when this audio stream was encrypted. Especially, when the session server 3 distributes only a predetermined number of audio streams corresponding to the audio streams with the highest volumes among the audio streams it receives, it is no longer necessary for the session server 3 to decode, and possibly decrypt, this audio stream in order to be able to determine its sound volume and therefore to be able to determine whether this audio stream should be distributed or not.

In examples in which at least one of the at least one audio parameters corresponds to a frequency of the audio stream acquired by the terminal 2, the audio stream is sent to session server 3 only when the audio stream contains a frequency within a predetermined frequency range. Thus, when the terminal 2 acquires audio streams which do not comprise a frequency belonging to the predetermined frequency range, these audio streams are not sent to the session server 3. They are filtered by the terminal 2.

In examples, the predetermined frequency range may correspond to a frequency range of human voice. Thus, when an audio stream acquired by terminal 2 does not contain a frequency belonging to a frequency range of human voice, the audio stream acquired by the terminal 2 is not sent to the session server 3. This avoids sending audio streams to the session server 3 that only comprise noise accidentally acquired by the terminal 2.

In examples, the predetermined frequency range may, for example, correspond to a first frequency range extending from 30 to 3000 Hz or to a second frequency range extending from 60 to 500 Hz. The first frequency range covers all the frequencies of human voice, especially those of sopranos and altos when singing. The second frequency range covers all the frequencies of human voice when spoken but not necessarily when sung.

The present disclosure also sets forth a terminal configured to implement any of the methods set forth by the present disclosure.

The method according to the present disclosure therefore makes it possible to save computational resources of the session server 3 responsible for distributing conference session data streams by cleverly using computational resources of the terminal 2 to discriminate between the audio streams upstream of the data exchanges between terminal and server. In this way, the session server 3 does not have to decode, or possibly decrypt, all the audio streams acquired by the terminals in real time. Filtering, namely selecting streams, is at least partly implemented at the transmitting terminals.

The invention claimed is:

1. A method, implemented by a terminal, for sending an audio stream from said terminal participating in a conference session in which a plurality of third-party terminals are further participating;

wherein data packets of audio streams transmitted by said terminal and said third-party terminals are encapsulated according to an internet protocol, and wherein an audio stream transmitted by each of said terminal and said third-party terminals is sent to a session server which distributes the audio stream to other terminals participating in the conference, the method comprising:

determining at least one audio parameter of the audio stream acquired by said terminal; wherein the at least one audio parameters comprises a frequency of the audio stream acquired by said terminal; and sending or not sending the audio stream to the session server depending on a value of the at least one audio parameter, wherein the audio stream is sent to the session server only when the audio stream contains a frequency within a predetermined frequency range.

2. A method, implemented by a terminal, for sending an audio stream from said terminal participating in a conference session in which a plurality of third-party terminals are further participating;
- wherein data packets of audio streams transmitted by said terminal and said third-party terminals are encapsulated according to an internet protocol, and wherein an audio stream transmitted by each of said terminal and said third-party terminals is sent to a session server which distributes the audio stream to other terminals participating in the conference, the method comprising:
- determining at least one audio parameter of the audio stream acquired by said terminal, wherein the at least one audio parameters comprises a sound volume of the audio stream acquired by the terminal;
- sending or not sending the audio stream to the session server depending on a value of the at least one audio parameter, wherein the audio stream is sent to the session server only when the sound volume of the acquired audio stream is greater than a predetermined sound volume threshold;
- wherein the method further comprises:
- receiving a value of a sound volume from the session server;
- and wherein the predetermined sound volume threshold is determined to be equal to the value of the sound volume received from the session server.

3. The method according to claim 2 wherein, when the audio stream is sent to the session server, the method further comprises:
- transmitting a value of the sound volume of the audio stream.

4. The method according to claim 1, wherein the predetermined frequency range corresponds to a frequency range of human voice.

5. The method according to claim 1, wherein the predetermined frequency range extends from 30 to 3000 Hz.

6. A terminal configured to implement the method according to claim 1.

7. A terminal configured to implement the method according to claim 2.

8. The terminal according to claim 6, wherein the terminal corresponds to a cell phone or a computer.

9. The terminal according to claim 7, wherein the terminal corresponds to a cell phone or a computer.

10. A computer program product including instructions for implementing the method according to claim 1 when this program is executed by a processor.

11. A computer program product including instructions for implementing the method according to claim 2 when this program is executed by a processor.

* * * * *